United States Patent
Kaimoto et al.

(10) Patent No.: US 11,163,213 B2
(45) Date of Patent: Nov. 2, 2021

(54) LIGHTING DEVICE AND IMAGING DEVICE

(71) Applicants: PANASONIC PHOTO & LIGHTING CO., LTD., Takatsuki (JP); CANON KABUSHIKI KAISHA, Tokyo (JP)

(72) Inventors: Minenori Kaimoto, Osaka (JP); Yutaka Yamamoto, Tokyo (JP)

(73) Assignees: PANASONIC PHOTO & LIGHTING CO., LTD., Osaka (JP); CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/644,391

(22) PCT Filed: Sep. 6, 2018

(86) PCT No.: PCT/JP2018/033095
§ 371 (c)(1),
(2) Date: Mar. 4, 2020

(87) PCT Pub. No.: WO2019/049949
PCT Pub. Date: Mar. 14, 2019

(65) Prior Publication Data
US 2021/0063846 A1   Mar. 4, 2021

(30) Foreign Application Priority Data
Sep. 7, 2017   (JP) .............................. JP2017-171638

(51) Int. Cl.
*G03B 15/05* (2021.01)
*F16H 1/20* (2006.01)
*F16H 19/08* (2006.01)

(52) U.S. Cl.
CPC .............. *G03B 15/05* (2013.01); *F16H 1/203* (2013.01); *F16H 19/08* (2013.01); *G03B 2215/056* (2013.01); *G03B 2215/0521* (2013.01)

(58) Field of Classification Search
None
See application file for complete search history.

(56) References Cited

U.S. PATENT DOCUMENTS

2011/0090695 A1   4/2011   Yanai
2012/0258837 A1   10/2012  Matsui
(Continued)

FOREIGN PATENT DOCUMENTS

CN   201716503 U   1/2011
CN   102073196      5/2011
(Continued)

OTHER PUBLICATIONS

International Search Report of PCT/JP2018/033095, dated Dec. 11, 2018, 4 pages including English translation.
(Continued)

*Primary Examiner* — William B Perkey
(74) *Attorney, Agent, or Firm* — Hamre, Schumann, Mueller & Larson, P.C.

(57) ABSTRACT

A lighting device is provided in which a head part is allowed to be driven relative to a main unit in a horizontal circular direction and in a vertical circular direction separately without the need for increasing a space for the layout of the main unit and the like. The lighting device of the present invention includes a driving unit (7) connecting a main unit (3) and a head part (6). The driving unit (7) includes first and second motors, a first power transmission mechanism that rotates the driving unit (7) in a horizontal circular direction (the direction of an arrow F) with the driving force of the first motor, and a second power transmission mechanism that rotates the driving unit (7) in a vertical circular direction (the direction of an arrow B) with the driving force of the second motor. With this configuration, the head part (6) is allowed to be driven relative to the main unit (3) in the horizontal circular direction and the vertical circular direc- (Continued)

tion separately, without the need for increasing a space for the layout of the main unit (3) and the like.

6 Claims, 15 Drawing Sheets

(56) References Cited

U.S. PATENT DOCUMENTS

| | | | |
|---|---|---|---|
| 2015/0022992 A1 | 1/2015 | Kaimoto | |
| 2015/0062861 A1 | 3/2015 | Yamashita | |
| 2015/0261068 A1 | 9/2015 | Ooyama et al. | |
| 2016/0330356 A1* | 11/2016 | Saito | G03B 15/05 |
| 2018/0112859 A1 | 4/2018 | Yamamoto | |

FOREIGN PATENT DOCUMENTS

| | | |
|---|---|---|
| CN | 102667611 | 9/2012 |
| JP | 2013-178355 | 9/2013 |
| JP | 2014-038268 | 2/2014 |
| JP | 2015-049280 | 3/2015 |
| JP | 2018-072371 | 5/2018 |

OTHER PUBLICATIONS

Office Action issued for Chinese Application No. 201880057605.0, dated Feb. 9, 2021, 16 pages including machine translation.

* cited by examiner

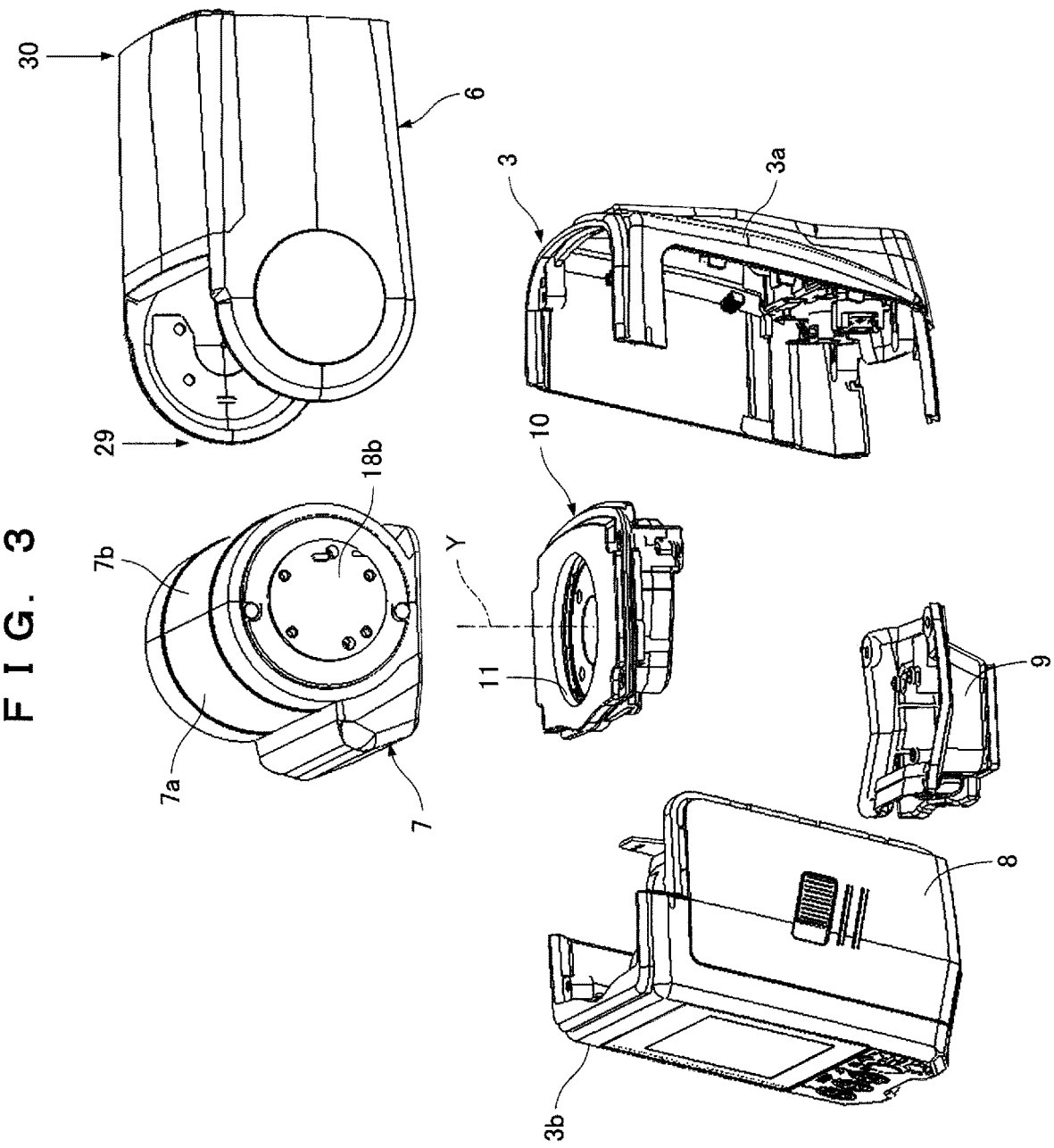

FIG. 11
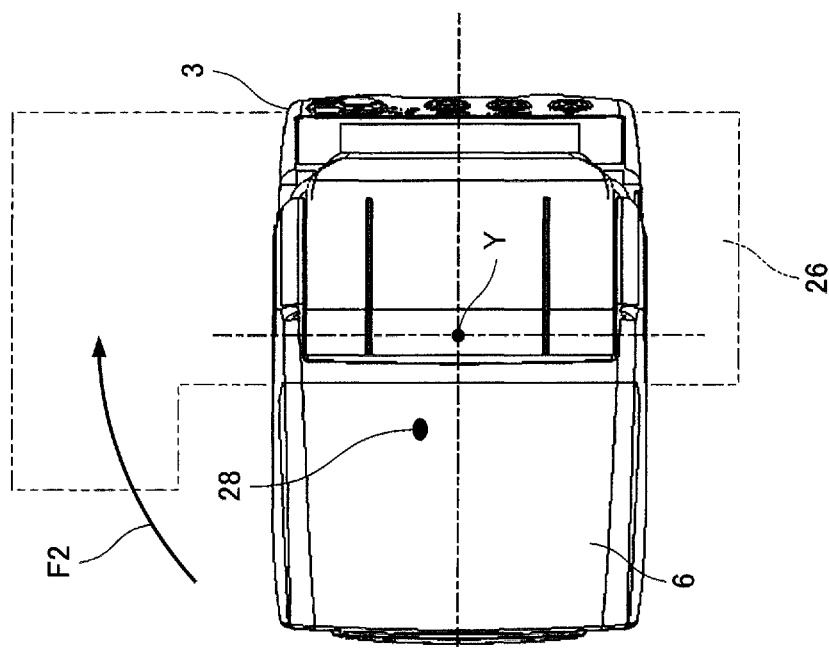
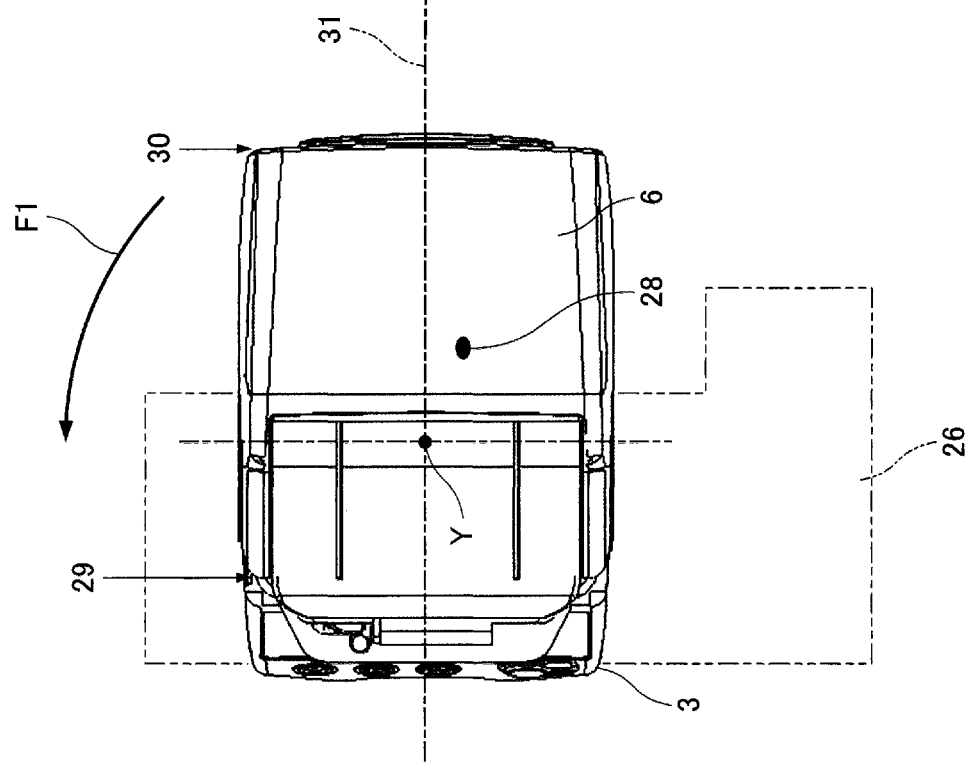

F I G. 1 2
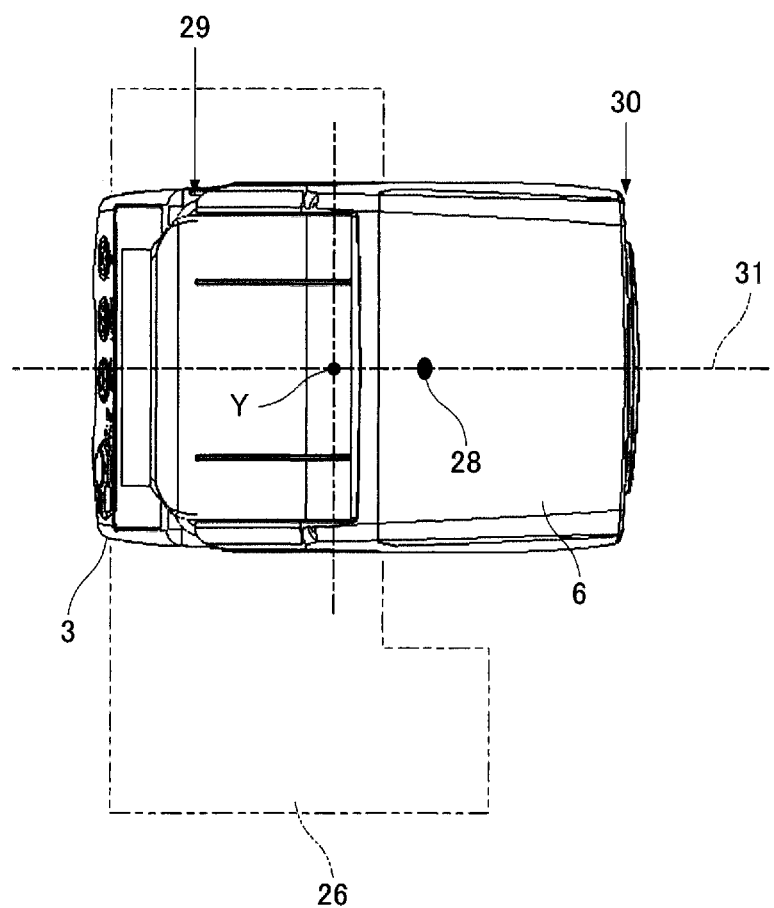

F I G. 14
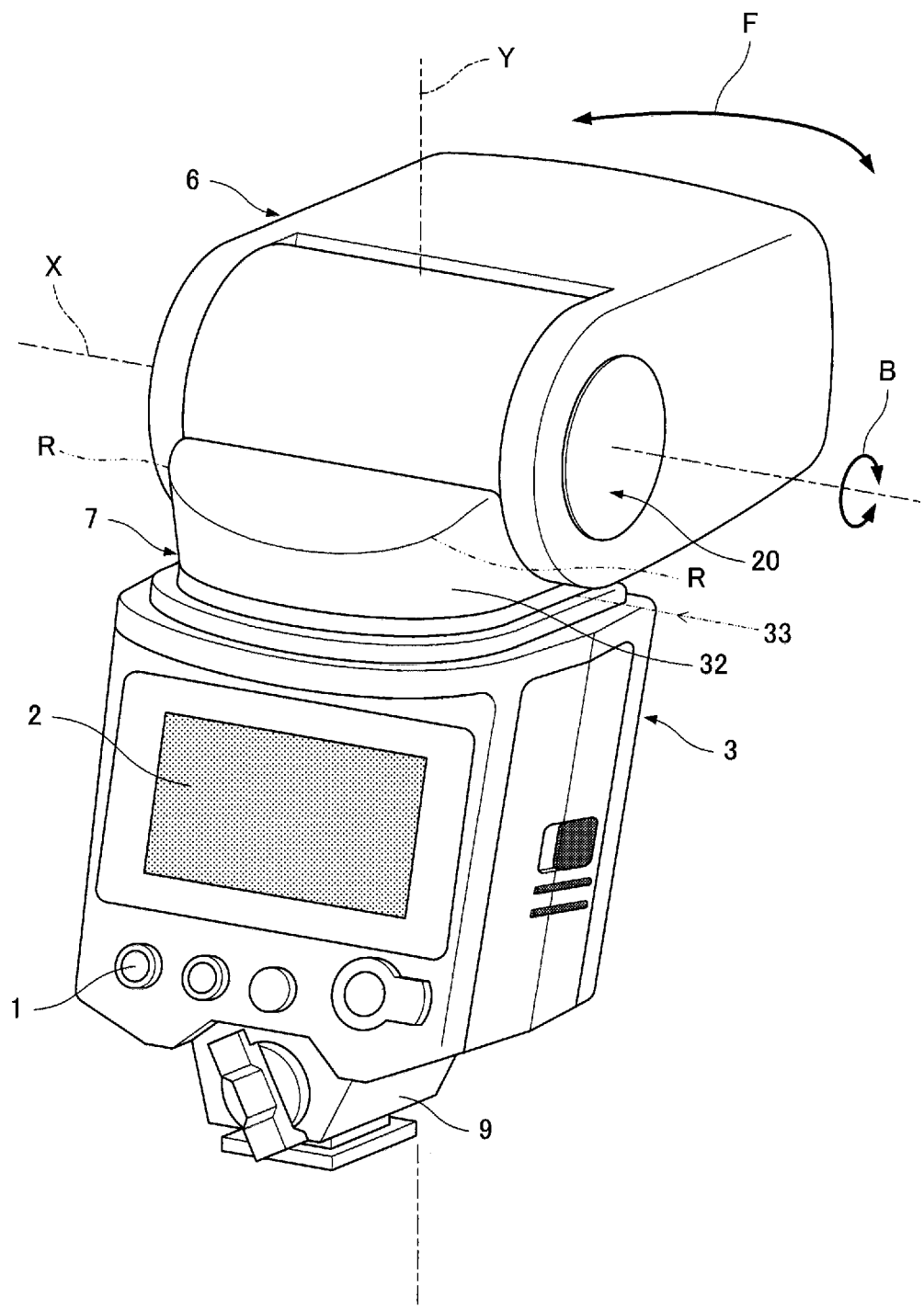

LIGHTING DEVICE AND IMAGING DEVICE

FIELD OF THE INVENTION

The present invention relates to a lighting device that is attached to and used on an imaging device.

BACKGROUND OF THE INVENTION

An imaging device with a lighting device performs bounce photography in which the light-emitting surface of a head part is not opposed to a subject and light is directed to a reflector, e.g., a ceiling or a wall surface, is scattered therefrom, and indirectly illuminates the subject to capture an image of the subject.

The control unit of the lighting device in bounce photography automatically controls a bounce angle between the optical axis direction of the taking lens of the imaging device and the direction of emitting light by specifying, for example, a ceiling surface, a right wall surface, or a left side as a reflector.

Japanese Patent Laid-Open No. 2014-38268 discloses a lighting device including a mechanism that drives pivoting of a head part 6 in a horizontal circular direction (the direction of an arrow F in FIG. 13B) relative to a main unit (the main unit of the lighting device) 3 and a mechanism that drives pivoting of the distal end of the head part 6 with respect to the proximal end of the head part 6 in a vertical circular direction (the direction of an arrow B in FIG. 13A), the distal end being adjacent to a light-emitting surface. Reference numeral 4 denotes a xenon discharge tube serving as a light source built in the head part 6 and reference numeral 5 denotes a reflector umbrella built in the head part 6. At the bottom of the main unit 3, a terminal unit 9 is provided in contact with the accessary shoe of a camera acting as an imaging device.

Japanese Patent Laid-Open No. 2014-38268 discloses a structure in which a unit for driving the head part in a horizontal circular direction is built in the main unit 3 and a unit for driving the head part in a vertical circular direction is built in the head part 6. The main unit 3 requires a space for the layout of a battery serving as an energy source in addition to the layout of a circuit board where the electronic circuit of a control unit is constructed, the switches of various interfaces, and a display panel. In the main unit 3, the provision therein of the driving unit for driving in a horizontal circular direction increases the space for the layout.

In the flash unit (lighting device) disclosed in Japanese Patent Laid-Open No. 2014-38268, the unit for driving the head part 6 in a horizontal circular direction and the unit for driving the head part 6 in a vertical circular direction are separated from each other and thus need to be separately inspected.

An object of the present invention is to provide a lighting device in which a head part is allowed to be driven in a horizontal circular direction and in a vertical circular direction separately relative to a main unit without the need for increasing a space for the layout of the main unit and the like.

DISCLOSURE OF THE INVENTION

A lighting device of the present invention includes: a main unit; a head part with a light source mounted at the distal end of the head part, the distal end being adjacent to a light-emitting surface; and a driving unit connecting the main unit and the proximal end of the head part, the proximal end being opposite from the light-emitting surface, the driving unit including: a first motor; a second motor; a first power transmission mechanism that is engaged with the main unit and pivots the driving unit in a first direction relative to the main unit with the driving force of the first motor; and a second power transmission mechanism that is engaged with the proximal end of the head part and pivots the driving unit in a second direction crossing with the first direction relative to the main unit with the driving force of the second motor.

With this configuration, the first and second motors and the first and second power transmission mechanisms are disposed in the driving unit connecting the main unit and the proximal end of the head part, thereby allowing driving the head part relative to the main unit in a horizontal circular direction and in a vertical circular direction separately without the need for increasing a space for the layout of the main unit and the like.

Furthermore, the first and second motors and the first and second power transmission mechanisms are all disposed in the driving unit, so that a bounce driving mechanism can be inspected in the first and second directions only by inspecting the single unit.

BRIEF DESCRIPTION OF THE DRAWINGS

FIG. 3 is an exploded perspective view of the embodiment;

FIG. 11 is a plan view of the embodiment (a) when a head part is rotated to the left with a camera moved to the right position from landscape orientation for photography and (b) when the head part is rotated to the right with the camera moved to the left position from landscape orientation for photography;

FIG. 12 is a plane view illustrating the center of gravity according to another embodiment;

FIG. 14 is a rear perspective view illustrating a lighting device according to further embodiment.

DESCRIPTION OF THE EMBODIMENTS

A lighting device of the present invention will be described below in accordance with embodiments.

Figure 1:
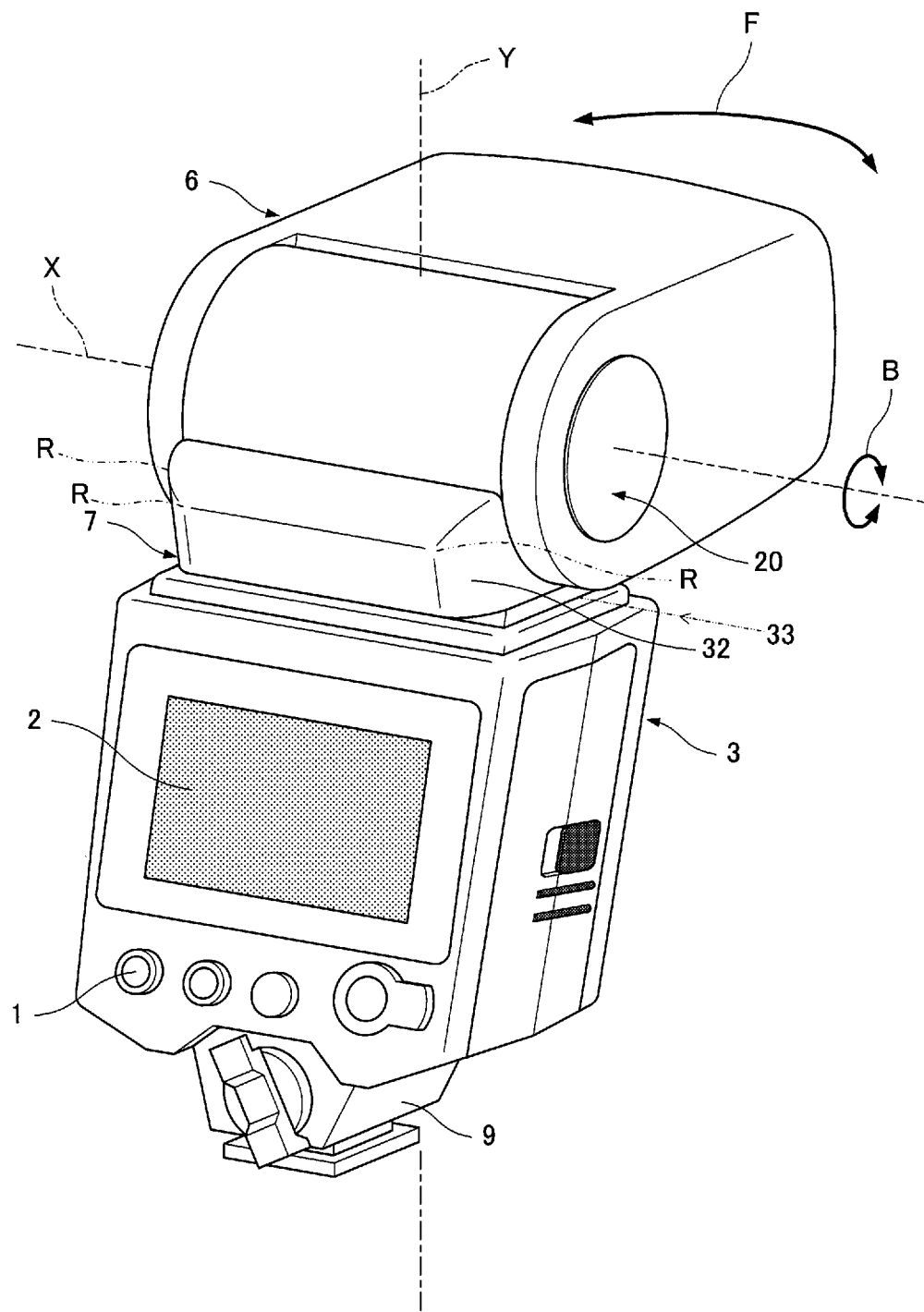
FIG. 1 is a rear perspective view illustrating a lighting device according to an embodiment of the present invention.
Figure 2A:
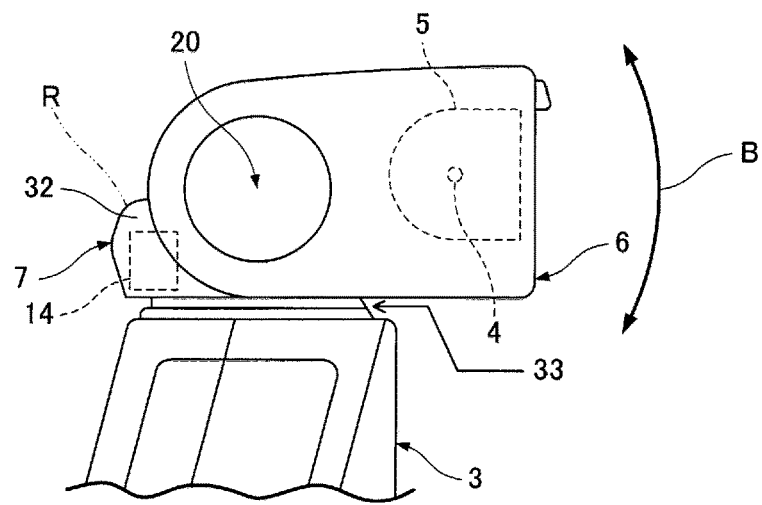
FIG. 2A is a side view illustrating a principal part of the embodiment.
Figure 2B:
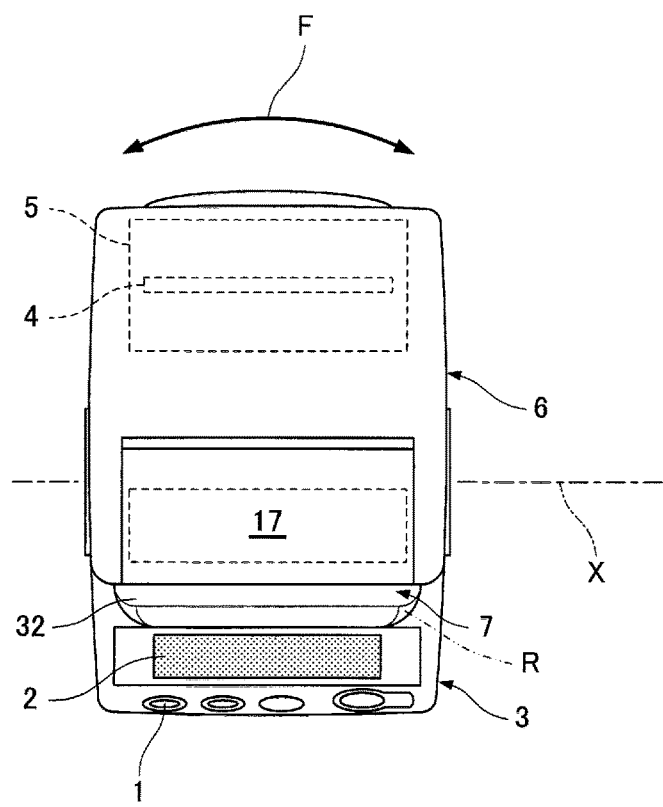
FIG. 2B is a plan view of the embodiment.

FIG. 1 is an external perspective view of the lighting device according to the present invention. FIG. 2A is a side view of a principal part. FIG. 2B is a plan view of the principal part.

The lighting device includes, as main parts, a main unit (the main unit of the lighting device) 3 including a battery serving as an energy source or the like in addition to a circuit board where the electronic circuit of a control unit is constructed, switches 1 of various interfaces, and a display panel 2, a head part 6 including a xenon discharge tube 4 serving as a light source and a reflector umbrella 5, and a driving unit 7 connecting the main unit 3 and the proximal end of the head part 6. The main unit 3 also includes a sensor for detecting the inclination and direction of the head part 6.

As illustrated in FIG. 3, the exterior of the main unit 3 includes a front part 3a, a rear part 3b, a battery compartment lid 8, a terminal unit 9 held by the bottom of the front part 3a and the bottom of the rear part 3b therebetween, and a top unit 10 held by the top of the front part 3a and the top of the rear part 3b therebetween. The top unit 10 has a communicating hole 11 where an electric wire for connecting the interior of the main unit 3 and the side of the head part 6 is inserted.

Figure 4:
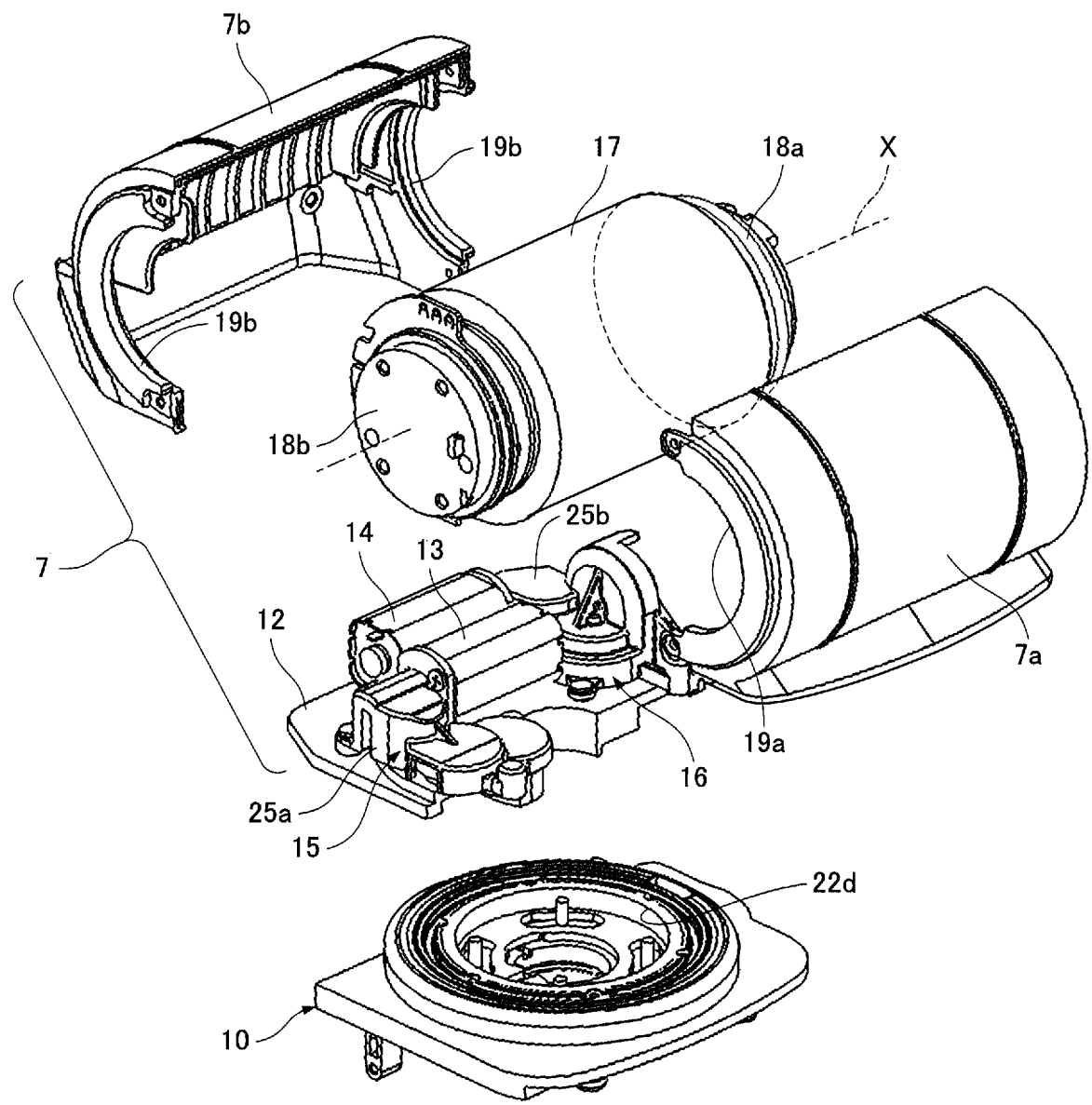
FIG. 4 is an exploded perspective view illustrating a driving unit according to the embodiment.

As illustrated in FIG. 4, the driving unit 7 includes a base plate 12 in parallel to the top surface of the top unit 10, a first motor 13, a second motor 14, a first power transmission mechanism 15, and a second power transmission mechanism 16 that are attached to the base plate 12, a cylindrical main capacitor 17 having a large capacitance, a gear 18a and a dummy disc 18b that hold the main capacitor 17 therebetween, and a driving-unit front part 7a and a driving-unit rear part 7b that are attached to the base plate 12 and specifically cover the base plate 12 so as to hold the base plate 12 therebetween from the front and the rear. The main capacitor 17 is a capacitor that applies a discharge voltage to the xenon discharge tube 4 and is charged with a power-supply output voltage raised from the output voltage of the battery.

In a state where the driving unit 7 and the head part 6 are coupled to each other, the gear 18a and the dummy disc 18b are coupled to each other via the exterior of the head part 6. In this embodiment, the gear 18a and the dummy disc 18b are supported and positioned by right and left concave parts 19a of the driving-unit front part 7a and right and left concave parts 19b of the driving-unit rear part 7b, which hold the base plate 12 therebetween, and a bearing 20 supports the head part 6 so as to pivot in a vertical circular direction B (the direction of rotation about a laterally extending central axis X) in engagement with the proximal end of the head part 6.

Figure 5:
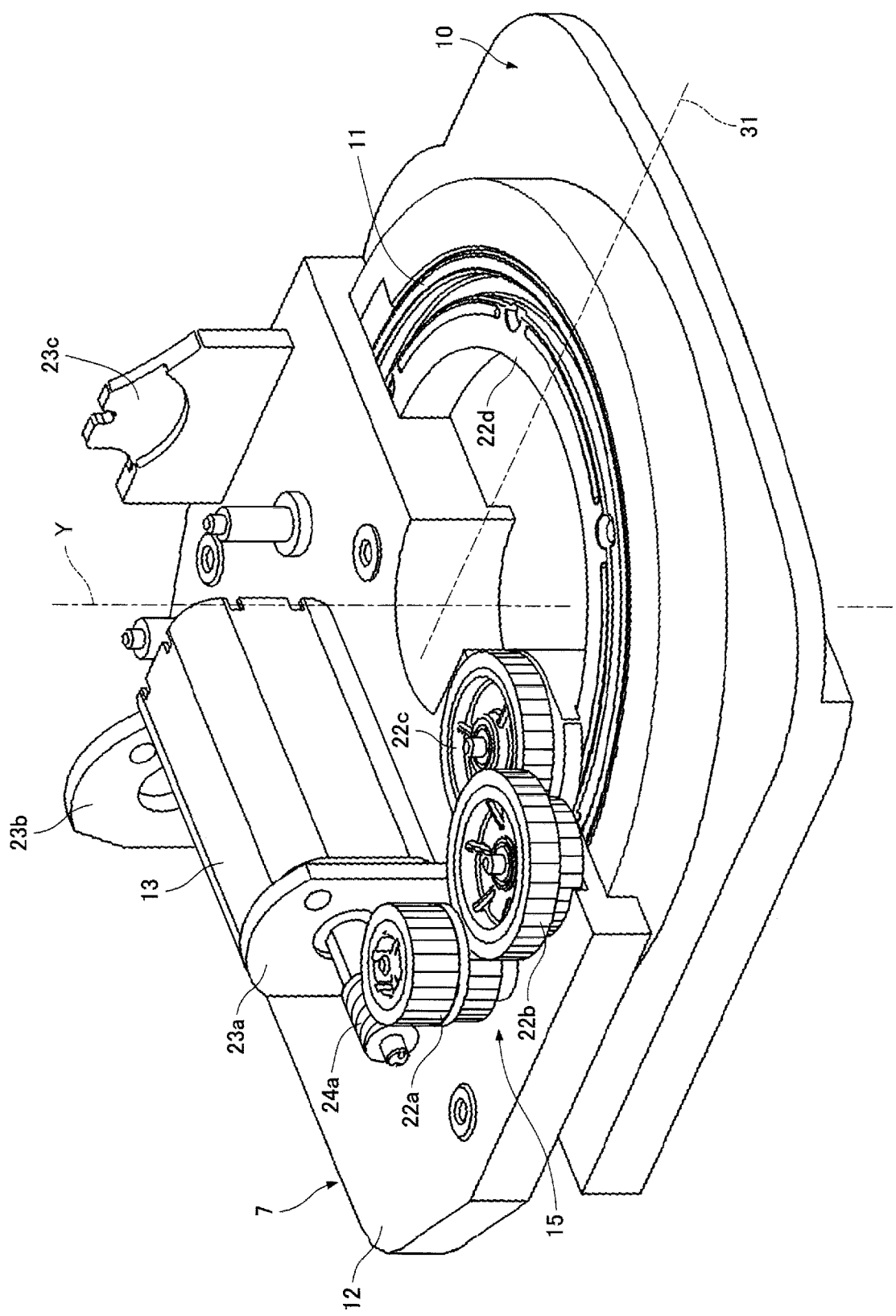
FIG. 5 is a perspective view illustrating the driving unit partially assembled into a top unit according to the embodiment.
Figure 6:
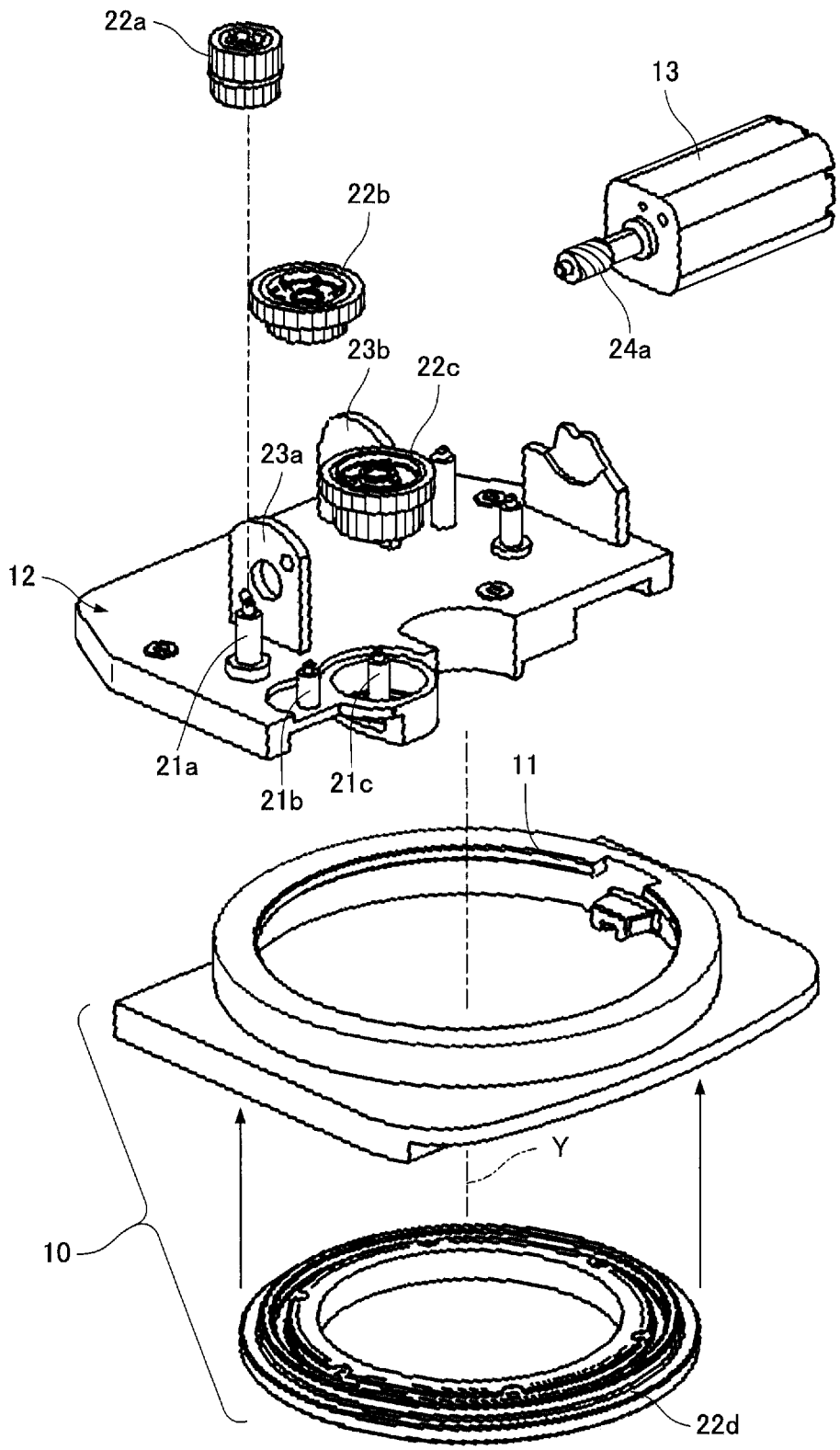
FIG. 6 is an exploded perspective view of FIG. 5.
Figure 7:
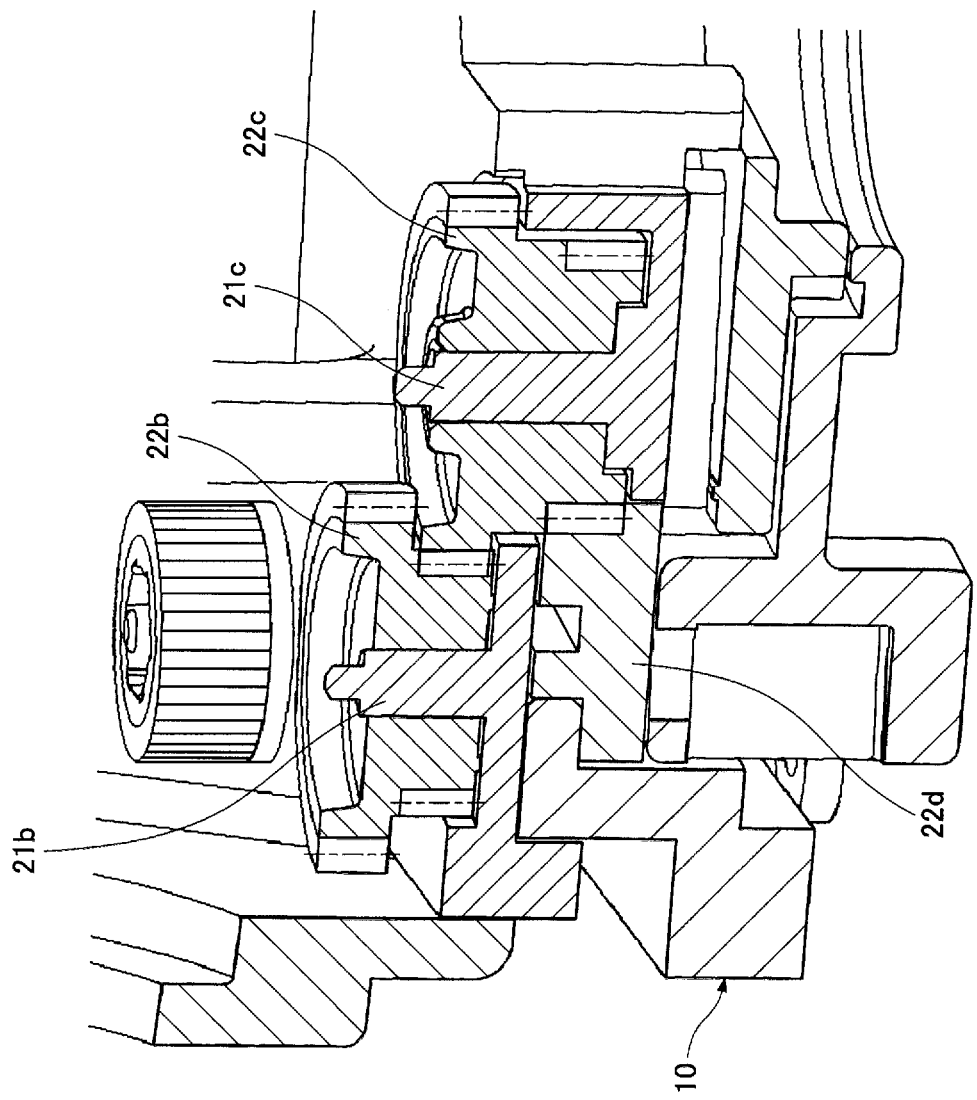
FIG. 7 is a cross-sectional view illustrating the connected state of FIG. 5.

As illustrated in FIGS. 5 and 6, the first power transmission mechanism 15 has gears 22a, 22b, and 22c that are supported by shafts 21a, 21b, and 21c integrally molded with resin on the base plate 12. The first motor 13 is attached to a rib 23a integrally molded on the base plate 12. As illustrated in FIG. 7, a worm gear 24a attached to the output shaft of the first motor 13 is engaged with the gears 22b and 22c via the gear 22a. The gear 22c is further engaged with an internal gear 22d attached inside the communicating hole 11 of the top unit 10. A cover 25a attached to the base plate 12 covers the worm gear 24a and the gears 22a, 22b, and 22c.

With this configuration, the rotation of the first motor 13 is transmitted to the internal gear 22d via the gears 22a, 22b, and 22c and pivots the base plate 12 about a central axis (longitudinally extending axis) Y of the internal gear 22d in a horizontal circular direction serving as a first direction while the top unit 10 is fixed. The pivot direction of the base plate 12 is changed according to the rotation direction of the first motor 13.

Figure 8:
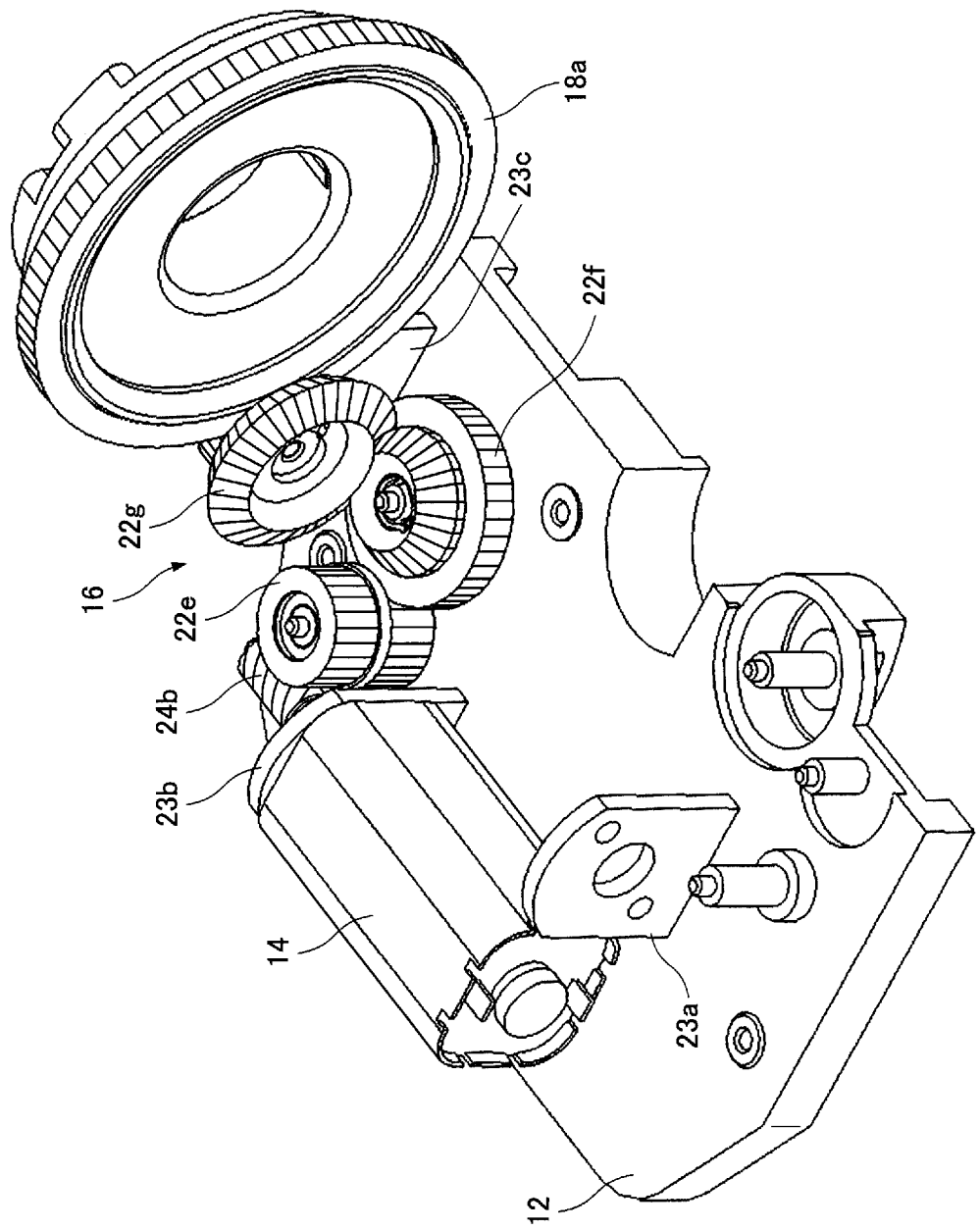
FIG. 8 is a perspective view illustrating the driving unit partially assembled into the top unit according to the embodiment.
Figure 9:
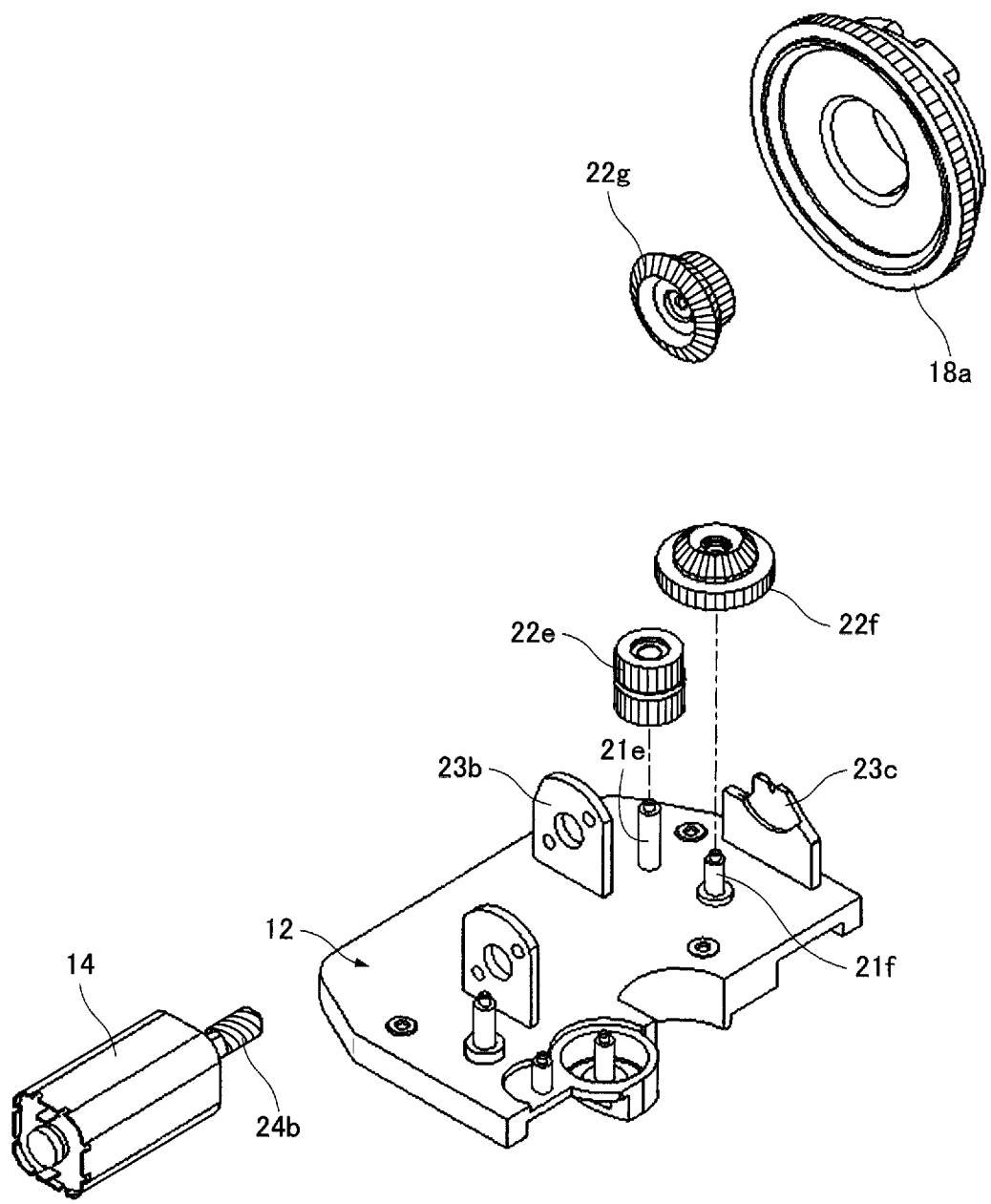
FIG. 9 is an exploded perspective view of FIG. 8.

As illustrated in FIGS. 8 and 9, the second power transmission mechanism 16 has a bevel gear 22g in addition to a gear 22e and a bevel gear 22f that are supported by shafts 21e and 21f integrally molded with resin on the base plate 12. The second motor 14 is attached to a rib 23b integrally molded on the base plate 12. A worm gear 24b attached to the output shaft of the second motor 14 is engaged with the bevel gear 22g via the gear 22e and the bevel gear 22f. The bevel gear 22g is further engaged with the rim of the gear 18a. A cover 25b attached to the base plate 12 covers the worm gear 24b, the gear 22e, and the bevel gears 22f and 22g. The bevel gear 22g is pivotally supported by a shaft (not illustrated) integrally molded on the cover 25b. The distal end of the shaft pivotally supporting the bevel gear 22g is supported by a rib 23c integrally molded on the base plate 12.

With this configuration, the rotation of the second motor 14 is transmitted to the gear 18a via the gear 22e and the bevel gears 22f and 22g and pivots the gear 18a about the central axis X of the gear 18a while the base plate 12 is fixed. Since the gear 18a is attached to the proximal end of the head part 6, the rotation of the second motor 14 pivots the distal end of the head part 6 with respect to the proximal end of the head part 6 in vertical circular direction B serving as a second direction crossing with the first direction. The direction of pivoting the head part 6 is changed according to the rotation direction of the second motor 14.

Moreover, the first and second motors 13 and 14 and the first and second power transmission mechanisms 15 and 16 are disposed in the driving unit 7 connecting the main unit 3 and the head part 6, thereby driving the head part 6 relative to the main unit 3 in horizontal circular direction F and vertical circular direction B without the need for increasing a space for the layout of the main unit 3 and the like.

Furthermore, the first and second motors 13 and 14 and the first and second power transmission mechanisms 15 and 16 are all disposed in the driving unit 7, so that a bounce driving mechanism can be inspected in the first and second directions only by inspecting the single unit.

Figure 10:
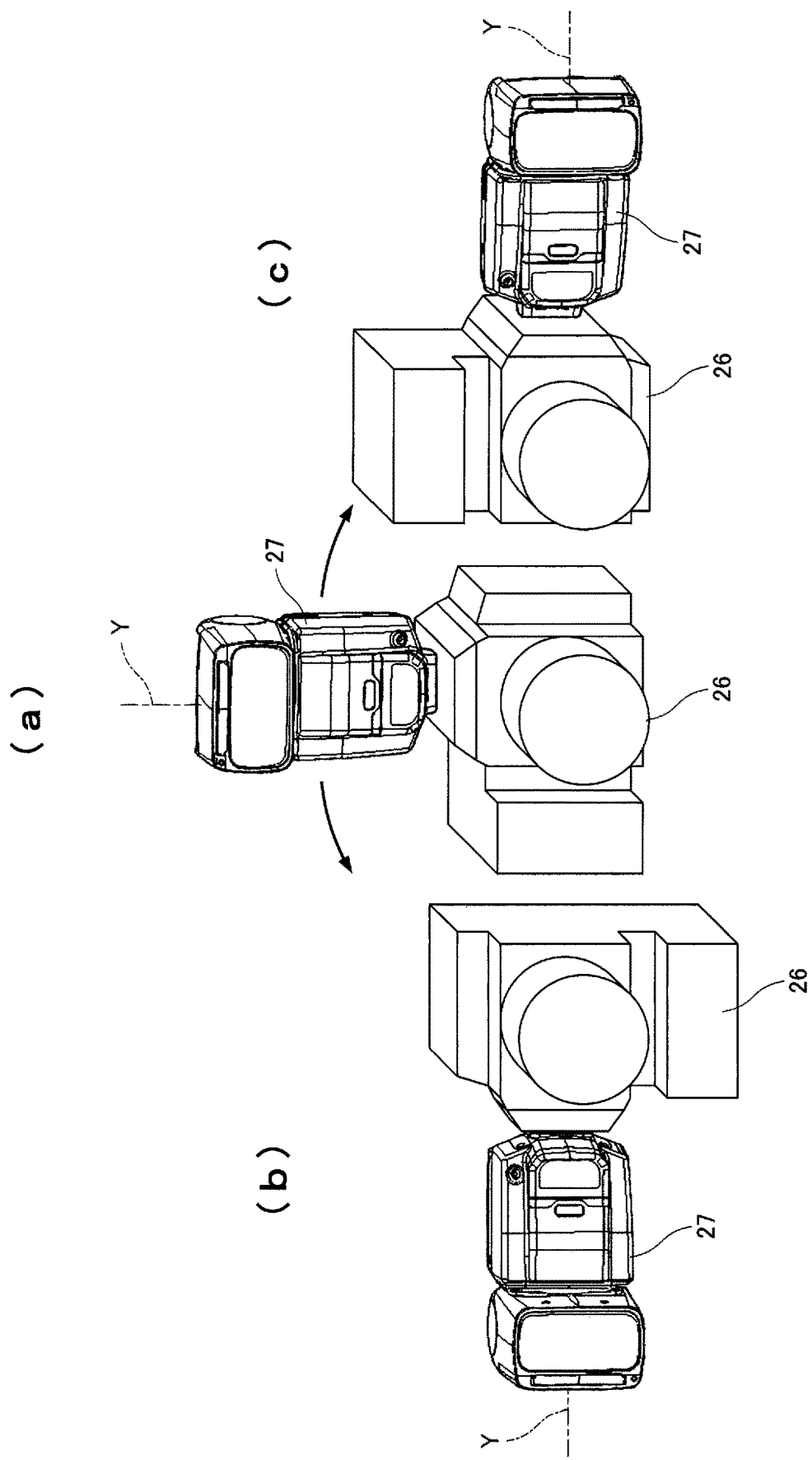
FIG. 10 is an explanatory drawing of an image-capturing state in (a) landscape orientation, and (b) and (c) portrait orientation.
Figure 13A:
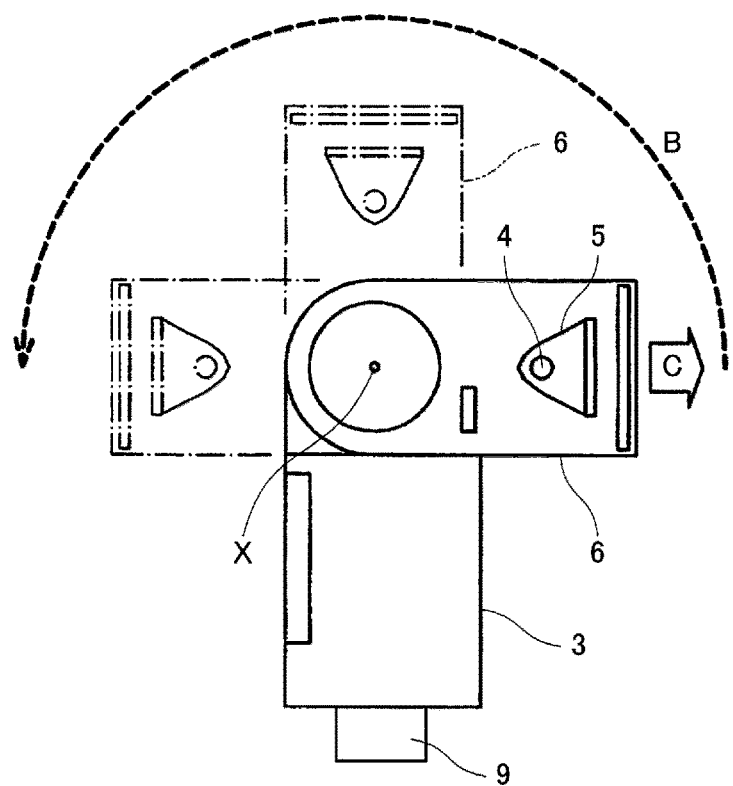
FIG. 13A is a side view illustrating a movement of the head part of a flash unit of the related art.
Figure 13B:
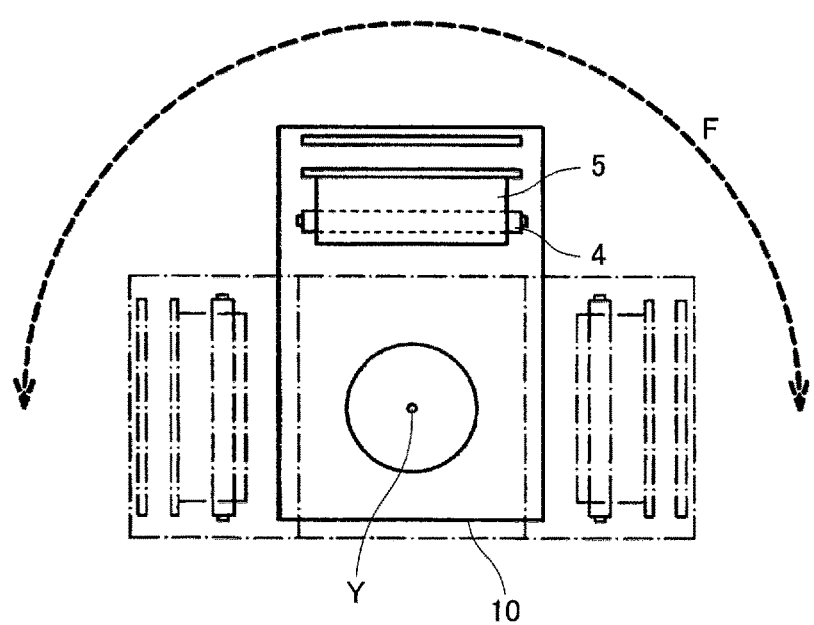
FIG. 13B is a plan view illustrating a movement of the head part of the flash unit of the related art.

(a) in FIG. 10 illustrates a camera 26 with a lighting device 27 attached to the camera when an image of a subject is captured in landscape orientation. (b) in FIG. 10 illustrates the camera 26 rotated from the state of (a) in FIG. 10 to the right position in order to capture an image of the subject in portrait orientation. Similarly, (c) in FIG. 10 illustrates the camera 26 rotated from the state of (a) in FIG. 10 to the left position in order to capture an image of the subject in portrait orientation. For example, if the camera 26 is rotated to the right position in (b) in FIG. 10 from landscape orientation for bounce photography using a ceiling as a reflector, as illustrated in (a) in FIG. 11, it is necessary to perform control such that the head part 6 is pivoted to the left in a horizontal circular direction (the direction of an arrow F1) relative to the main unit 3 by operating the first motor 13. If the camera 26 is rotated to the left position in (c) in FIG. 10, as illustrated in (b) in FIG. 11, it is necessary to perform control such that the head part 6 is pivoted to the right in a horizontal circular direction (the direction of an arrow F2) relative to the main unit 3 by operating the first motor 13.

In the lighting device of the embodiment, the driving unit 7 and the head part 6 are movable parts with respect to the main unit 3. As illustrated in (a) in FIG. 11, a layout in the driving unit 7 including the first and second motors 13 and 14 and the first and second power transmission mechanisms 15 and 16 is considered such that the movable parts have a center of gravity 28 near a center line 31 that passes through the central axis Y at the center of rotation of the driving unit 7 in the main unit 3 and connects a proximal end 29 of the head part 6 and a distal end 30 of the head part 6.

Specifically, the first and second motors 13 and 14 are disposed on the base plate 12 such that the rotation output shafts of the motors are parallel to the central axis X serving as the support-shaft direction of the bearing forming part 20 and the first and second power transmission mechanisms 15 and 16 are provided dividedly on the respective sides of the center line 31 so as to substantially balance the weight of the driving unit. As illustrated in FIGS. 1, 2A, and 2B, the base plate 12 and the driving-unit rear part 7b of the driving unit 7 have a projecting part 32 formed to project in the rear of the proximal end 29 of the head part 6. As indicated by a broken line in FIG. 2A, the second motor 14 is partially disposed in the projecting part 32. When the head part 6 pivots upward from the horizontal position during bounce photography, a rear wall surface U of the head part 6 comes into contact with the projecting part 32 so as to regulate the pivot range of the head part 6.

With this configuration, when the camera 26 is moved from the landscape orientation to the portrait orientation, the control unit of the first motor 13 can perform a controlling operation during driving and a controlling operation at shutdown only by changing the directions of rotation in the right and left landscape orientation. This eliminates the need for changing a control coefficient or the like, thereby simplifying the configuration of the control unit. As illustrated in FIG. 12, the layout of the driving unit 7 including the first and second motors 13 and 14 and the first and second power transmission mechanisms 15 and 16 is set such that the movable parts have the center of gravity 28 on the center line 31, thereby improving control stability.

As illustrated in FIGS. 1, 2A, and 2B, the outside shape of the projecting part 32 of the driving unit 7 includes a round portion R resin-molded at the corners. Thus, when the driving unit 7 rotates relative to the main unit 3, user's hair is hardly caught by the corners of the projecting part 32. If user's hair is caught by the corners of the projecting part 32, the portion from the caught portion onward of the hair may be disadvantageously caught into a gap 33 between the main unit 3 and the driving unit 7. This can be avoided by the round portion R formed at the corners of the projecting part 32 in the embodiment.

In the lighting device of the embodiment, the light source is a flash unit that is a xenon discharge tube. The light source may be a light-emitting diode or the like.

Figure 15:
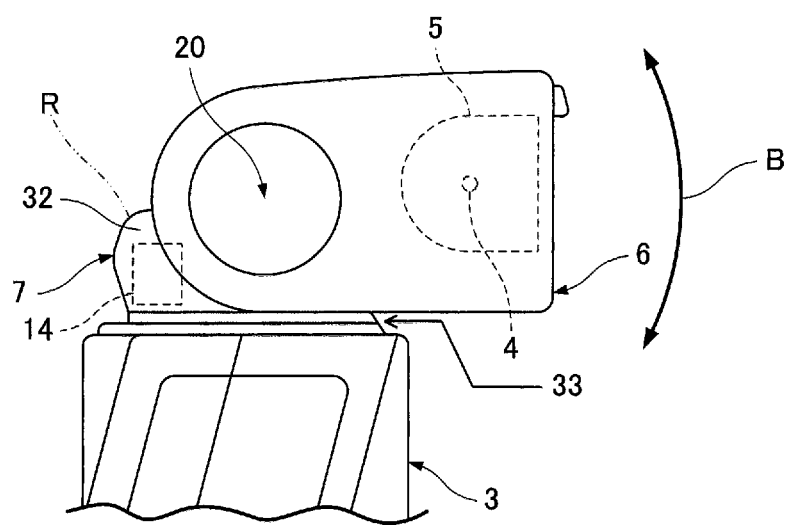
FIG. 15 is a side view illustrating a principal part of the further embodiment.

FIGS. 14 and 15 illustrate another embodiment.

In the lighting device illustrated in FIGS. 1, 2A, and 2B, the planar shape of the projecting part 32 of the driving unit 7 is an outside shape including the round portion R at the corners. As illustrated in FIG. 14, the planar shape of the projecting part 32 in the width direction in the lighting device can be formed into an arc by resin-molding with the central portion projecting rearward. In this case, as illustrated in FIG. 14, a part S of the main unit 3 is also resin-molded into an arc planar shape with the central portion projecting rearward instead of the planar shape in the width direction, the part S corresponding to the projecting part 32 of the driving unit 7. Moreover, as illustrated in FIG. 15, the part S of the main unit 3 is projected into an arc in the rear of the projecting part 32 such that the projecting part 32 is not placed out of the main unit 3 when the driving unit 7 and the head part 6 are driven in a horizontal circular direction. This can prevent the occurrence of accidents, e.g., a collision of the projecting part 32 with a user. The planar shape in the width direction of the projecting part 32 is formed into an arc, increasing the capacity of the internal space of the driving unit 7. Thus, the gears and motors of the driving unit 7 are disposed near the projecting part 32, thereby improving the workability of application of grease onto the gears in addition to the ease of assembly and inspection from the outside.

Furthermore, if the part S of the main unit 3 is projected rearward into an arc shape, the capacity of the internal space of the main unit 3 increases. Thus, this part can accommodate various switches for mode switching for inputting bounce driving and various display lamps or the like.

The lighting device of the present invention contributes to enhanced functionality of a high-performance lighting device that automatically controls the movement of the head part according to photography in landscape and portrait orientation by the imaging device during bounce photography.

What is claimed is:

1. A lighting device comprising:
   a main unit;
   a head part with a light source mounted therein at a distal end of the head part, the distal end being adjacent to a light-emitting surface; and
   a driving unit connecting the main unit and a proximal end of the head part, the proximal end being opposite from the light-emitting surface,
   the driving unit including:
   a first motor;
   a second motor;
   a first power transmission mechanism that is engaged with the main unit and pivots the driving unit in a first direction relative to the main unit with a driving force of the first motor;
   a second power transmission mechanism that is engaged with the proximal end of the head part and pivots the driving unit in a second direction crossing with the first direction relative to the main unit with a driving force of the second motor;
   a base plate parallel to a top surface of the main unit with the first and second motors and the first and second power transmission mechanisms mounted on the base plate; and
   a bearing that is engaged with the proximal end of the head part and supports the head part so as to pivot in the second direction,
   wherein a center of gravity of a movable side is disposed on or near a center line that passes through a rotation center line of the driving unit in the main unit and passes through the proximal end and the distal end of the head part, the movable side including the head part, the driving unit including therein the first and second motors and the first and second power transmission mechanisms, and a main capacitor,
   wherein the first and second motors are disposed with directions of rotation output shafts of the motors parallel to a support-shaft direction of the bearing supporting the head part so as to pivot in the second direction, and
   wherein the first power transmission mechanism and the second power transmission mechanism are provided dividedly on respective sides of the center line that passes through the rotation center line of the driving unit in the main unit and connects the proximal end and the distal end of the head part.

2. The lighting device according to claim 1, wherein the base plate of the driving unit has a projecting part formed to project in a rear of the proximal end of the head part, and the second motor is partially disposed in the projecting part.

3. The lighting device according to claim 2, wherein the projecting part has a planar shape in a width direction such that the planar shape is molded into an arc with a central portion projecting rearward, and a part of the main unit corresponds to the projecting part has a planar shape in the width direction such that the planar shape is molded into an arc with a central portion projecting rearward in a rear of the projecting part.

4. The lighting device according to claim 2, wherein the driving unit includes constituent elements disposed near the projecting part.

5. The lighting device according to claim 2, wherein the head part pivoted in the second direction (vertical direction) comes into contact with the projecting part so as to regulate pivoting.

6. An imaging device comprising the lighting device according to claim 1.

\* \* \* \* \*